Sept. 27, 1966      E. S. MAY      3,275,332
OIL SEAL

Filed March 2, 1964     2 Sheets-Sheet 1

INVENTOR.
EVALYN S. MAY

BY
ATTORNEYS

Sept. 27, 1966 E. S. MAY 3,275,332
OIL SEAL
Filed March 2, 1964 2 Sheets-Sheet 2
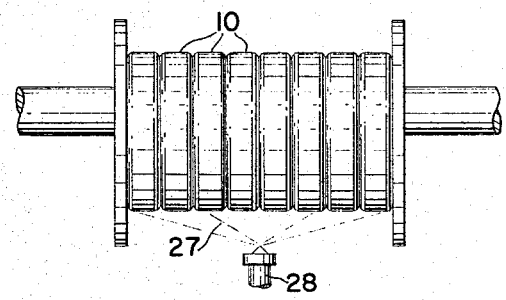
FIG_2
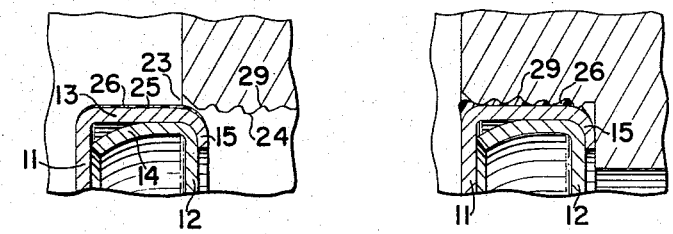
FIG_3  FIG_4
INVENTOR.
EVALYN S. MAY

United States Patent Office 3,275,332
Patented Sept. 27, 1966

3,275,332
OIL SEAL
Evalyn S. May, Redwood City, Calif., assignor to Federal-Mogul Corporation, a corporation of Michigan
Filed Mar. 2, 1964, Ser. No. 348,697
5 Claims. (Cl. 277—37)

This invention relates to improvements in metal-encased oil seals of the type employed on shafts and the like; more particularly, it relates to an improvement in coated seals of the type in which a thin shearable coating is provided in order to improve the sealing at the press fit of the metal case of the oil seal into the housing bore of a machine.

The present invention is an improvement of the invention of Clifford A. Stephens and Robert W. McCandless in U.S. Patent 2,889,163. In that patent the problem of obtaining a good press fit of a metal case in the housing bore was discussed, and a solution for the problem was presented, namely, the use of a synthetic resin coating which was more easily sheared off from itself than it could be stripped from the metal; the shear strength of the coating along the direction of the application of the shearing force was less than the bond strength of the coating to the steel case.

Greatly improved results were obtained by Patent 2,889,163, but there was a remaining problem. Resins were not elastic enough to shear without crumbling and accumulating around the edge of the bore as the seal was pushed in. For some installations there were complaints that the crumbs from the coating got into and plugged some of the channels in the machines where the seals were installed. Also, where the scratches in the bore were deep, the resin coating was not able to flow enough to fill them and to act as an effective gasket.

While the resins had these difficulties it was recognized that they were better than elastomers or so-called rubbers, which had a grain that prevented them from shearing properly. Both hard and soft rubbers had this disadvantage, for instead of shearing they would break along the grain.

Thus, there has been a long-standing need for an oil seal having a case coating which would shear properly and would at the same time cohere and flow, rather than granulating, powdering, or forming crumbs.

This problem is solved by the present invention which provides a coating incorporating a chlorosulfonated polyethylene as the principal ingredient.

Other objects and advantages of the invention will appear from the following description of a preferred embodiment.

In the drawings:

FIG. 2 is a schematic view of one mode of applying the coating to a group of the oil seals.

FIG. 3 is a fragmentary view on an enlarged scale showing a seal of this invention about to be installed into a bore having scratches.

FIG. 4 is a view similar to FIG. 3 showing the installed seal.

Figure 1:
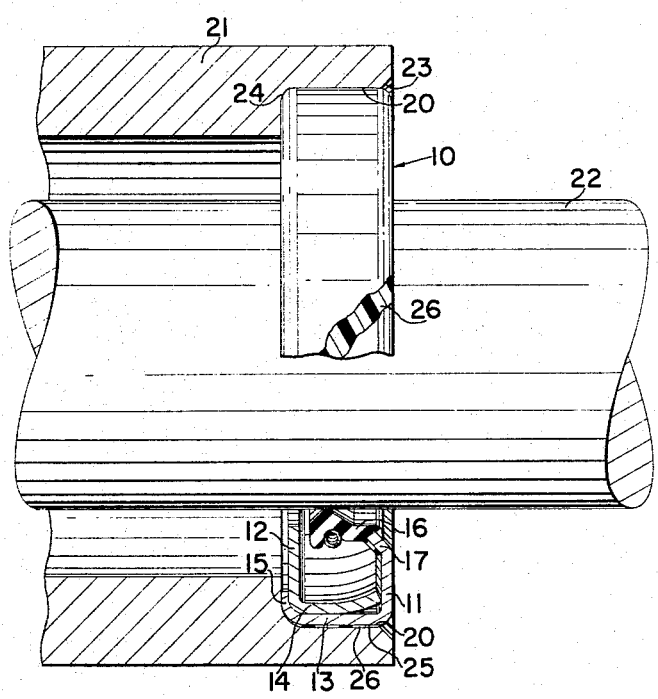
FIG. 1 is a view in elevation and partly in section of an oil seal incorporating the principles of the invention, installed on a rotatable shaft and in a housing bore.

FIG. 1 illustrates a typical oil seal 10 incorporating the principles of the present invention. It comprises an outer metal case 11 and an inner metal case 12, both normally of steel. The cases 11 and 12 face each other, and their cylindrical flanges 13 and 14 are nested together and held assembled by a curled-over rim 15 of the flange 13. An oil sealing element 16 is supported by the inner case 12 and may be made of leather, oil-resistant synthetic rubber, or other suitable material; it may be made in any of various shapes and configurations. As shown by way of example, a sealing element 16 of synthetic rubber is bonded to a terminal diagonal portion 17 of the case 11, according to U.S. Patent 3,004,298.

The typical oil seal 10 just described is mounted within a shouldered bore 20 of a machine housing 21 surrounding a shaft 22. The entering edge 23 of the bore 20 may be chamfered as an aid in guiding the rounded leading or toe edge 24 of the seal case 11 into position during the assembly operation. The diameter of the seal case 11 is normally several thousandths of an inch greater than that of the side wall of the bore 20, in order to provide a strong press fit or frictional fit between the seal case 11 and the housing bore 20. The present invention assures a leak-tight fit by providing the outer cylindrical surface 25 of the metal encased seal 10 with a coating 26 that is tightly bonded to the shell or case 11 and is yet capable of being sheared away to the extent necessary to fill any crevices, scratches, or surface blemishes in the wall of the housing bore 20 as the seal 10 is driven home therein during the assembly operation. The coating 26 is uniformly distributed over the entire outer cylindrical surface 25 of the case 11 to avoid eccentricity of the seal lip 16 with respect to the axis of the shaft 22. Like the device shown in U.S. Patent 2,889,163, the coating 26 may be applied to a thickness 0.0005" to 0.005" thick on the outside of the case 11, but it is much more effective than the coating of that patent and it does not crumble.

A key ingredient of the coating 26 is chlorosulfonated polyethylene, normally sold as a solid, in the form of white chips. For use, these chips are preferably dissolved in a suitable solvent such as toluene, with the aid of such dispersal agents as may be desired to maintain a good dispersion. If a pigment is to be incorporated, as is often done, it may be milled into the polyethylene before making this solution, the pigment being of a very fine grade so that it will not add lumps to the coating 26. After the pigment has been milled into the chlorosulfonated polyethylene, the milled mixture of chlorosulfonated polyethylene is dissolved in the toluene or other suitable solvent. For example, 100 parts of the chlorosulfonated polyethylene may be dissolved in 433 parts of toluene by weight (500 parts by volume). Pigment may be present in an amount up to about 15 or 16 parts by weight, and about 5 parts by weight of a dispersal agent may be added, if desired.

After the solids have been completely dissolved or dispersed, suitable curing agents are added. There are various curing systems for chlorosulfonated polyethylene. Some curing systems use a combination of polybasic metal oxides, organic acids, and organic accelerators; other systems use polyamides. Such systems are well known and may be used, if desired, with the caution that they have a short pot life, typically about four days, and usually require a relatively long curing time, typically several days. Also, some of these systems introduce objectionable pigmentation that may interfere with the obtaining of good strong colors where these are desired.

For that reason, I prefer to use an epoxy resin curing system. Such a system, I have found, has a pot life of about a year, possibly longer, while giving a cure time of approximately 45 minutes at 280° F. These curing agents are virtually colorless, do not complicate the problem of obtaining the proper color, and appear to enhance the adhesion of the chlorosulfonated polyethylene to the metal case.

To the solution of chlorosulfonated polyethylene with pigment and dispersal agent, as discussed above, may be added a toluene solution of epoxy resin. These epoxy polymers are reaction products of polyfunctional halohydrins with polyhydric alcohols and/or phenols to produce glycidyl polyethers, such as glycidyl polyethers of dihydric phenols, with a typical formula:

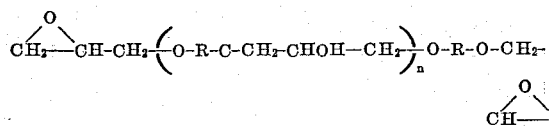

where $n$ is an integer of the series, 0, 1, 2, 3, etc., and R in the phenolic type of polymer represents the divalent hydrocarbon radical of a dihydric phenol. Further description of usable polymers is contained in Patent 2,500,600 issued March 14, 1950, to Bradley, and in Patent 2,602,785 issued July 8, 1952, to Wiles and Elam.

A polymer of this type preferred for use in the invention, manufactured by Shell Chemical Company and sold under the designation Epon 828, has the following approximate properties:

| | |
|---|---|
| Appearance (normal temp.) | viscous, amber liquid |
| Epoxide equivalent (gm./gm. equiv, epoxide) | 185 to 192 |
| Average molecular weight | 380 |
| Density (lbs./gal.) | 10.3 |
| Specific gravity | 1.17 |
| Refractive Index at 20° C. | 1.573 |
| Gardner-Holdt viscosity (solid) | $Z_5$–$Z_6$+ |
| Equivalent weight | 85 |
| $n$ (in foregoing formula) | 1 |

Fifteen parts by weight of this resin or of other substantially equivalent materials may be dissolved in approximately 177 parts by weight of toluene (approximately 205 parts by volume). To this may be added about two parts by weight of an accelerator such as tetraethyl thiuram disulfide, and about three-fifths of a part of another accelerator, diorthotolyguanidine.

When this solution is mixed it is added to the solution of chlorosulfonated polyethylene to give a solution containing about 18% solids and a pot life of at least two months and up to about a year. As shown in FIG. 2, this material 27 may be sprayed on the seal cases 11 at about 15 p.s.i. by a production sprayer 28, or at about 30 to 40 p.s.i. by a hand sprayer.

After the seal 10 has been coated, the coating 26 is cured, and this may be, for example, for 2 hours at 200° F., or 45 minutes at 280° F., or about two days at room temperature.

Tests made on this material show that while it does shear preferentially to stripping and acts in all the desirable ways of the acrylic resins and other coating materials named in the Stephens-McCandless Patent 2,889,163, it does not crumble, nor does it lack the ability to flow. As shown in FIGS. 3 and 4, it flows and fills scratches 29 in the bore 20. It is able to fill scratches 29 that are much deeper than could be filled by the materials formerly in use, and the absence of crumbs is extremely beneficial. Thus, this product solves the problems.

While I know of no material that can be substituted for the chloronated polyethylene in this instance, it is possible by adapting to short pot life and stringent curing techniques to use other curing agents; even with the epoxy curing agent it is possible to use other accelerators. Inert pigments, likewise, are no problem, and other solvents than toluene may be used such as hexane, or hexane concentrate diluted with acetone. Toluene, however, is an inexpensive and relatively safe solvent.

Tests have shown that a coating 26 of the present invention 0.001″ thick effectively seals against 20 p.s.i. of SAE 10 oil in bores up to 200 r.m.s. surface finish, and with bore scratches as deep as 0.004″. Heretofore, the best resins tried under the Stephens-McCandless patent were able to seal scratches from 0.001″ to 0.003″ deep only if the coating itself were 0.0025″ thick, and even coatings up to 0.005″ thick were unable to seal scratches 0.004″ deep.

As shown in FIG. 4, which is based on actual appearances, the material collects coherently on the outside of the bore instead of in crumbs.

I claim:

1. In oil seals for use in providing a substantially fluid-tight seal between a movable shaft member and a housing member having a bore through which said shaft extends and wherein said seal is provided with a cylindrical surface adapted to have a press fit with one of said members, the improvement comprising a thin layer, at least as thick as the average surface roughness of said bore, of cured chlorosulfonated polyethylene bonded to said cylindrical surface, said material responding to high shearing and pressure forces so that when such forces act during the assembly of the seal into the bore of a housing member they cause said material to move and fill imperfections in the bore wall and form a fluid-tight seal therewith as well as a strong joint between said oil seal and the bore wall, with any excess remaining coherent and balling rather than crumbling.

2. In combination, a movable shaft, a housing wall having an opening through which said shaft projects in spaced relation thereto, an oil seal bore in said wall opening concentric with said shaft, a metal-encased oil seal for sealing the space between said bore and said shaft, and means for anchoring a cylindrical wall of said oil seal case against a cylindrical wall of said bore in a fluid-tight manner comprising a layer of epoxy-resin-containing chlorosulfonated polyethylene pre-bonded to one of said cylindrical walls, said layer being uniformly distributed over said surface to a thickness at least as great as the average surface roughness of said bore and fixed against displacement therefrom except when subjected to high pressure or shearing forces whereby excess portions of said layer are removed as said seal is press-fitted into said bore to fill irregularities in the uncoated cylindrical wall up to four times as thick as said layer, leaving portions of said cylindrical walls in metal-to-metal contact with one another during the assembly of said oil seal into said bore, the excess forced out from between said bore and said seal remaining coherent and adherent to said seal.

3. An oil seal for sealing the space between a rotatable shaft and a housing through which said shaft extends, said seal comprising a metal casing having an outer cylindrical surface adapted to have a tight mechanical press fit with a concentrically arranged bore wall in a housing wall, a resilient sealing ring element having a support portion secured to said metal casing in a fluid-tight manner and having an inner peripheral lip adapted to seal against a rotatable shaft in a fluid-tight manner, and a thin coating of cured chlorosulfonated polyethylene at least 0.0005″ thick bonded to the outer cylindrical surface of said casing, said coating being highly resistant to abrasion and subject to deformation and flow under shearing and high pressure forces so as to accommodate said coating to imperfections in a bore wall and to form a fluid-tight seal and anchorage between said oil seal casing and a bore wall, said coating remaining coherent and adherent to said casing rather than crumbling away when displaced.

4. The seal of claim 3 wherein said coating contains a glycidyl polyether of dihydric phenol as curing agent to render said coating more adherent to the metal casing.

5. An oil seal for sealing the space between a rotatable shaft and a housing through which said shaft extends, said seal comprising a metal casing having an outer cylindrical surface adapted to have a tight mechanical press fit with a concentrically arranged bore wall in a housing wall, a resilient sealing ring element having a support portion secured to said metal casing in a fluid-tight manner and having an inner peripheral lip adapted to seal against a rotatable shaft in a fluid-tight manner, and a thin coating of epoxy-cured chlorosulfonated polyethylene approximately 0.0005" to 0.005" thick bonded to the outer cylindrical surface of said casing.

References Cited by the Examiner

UNITED STATES PATENTS

| | | | |
|---|---|---|---|
| 2,646,295 | 7/1953 | Victor | 277—184 |
| 2,695,801 | 11/1954 | Kosatka | 277—37 |
| 2,819,106 | 1/1958 | Voorhees | 277—37 X |
| 2,834,616 | 5/1958 | Gebert et al. | 277—37 |
| 2,889,163 | 6/1958 | Stephens et al. | 277—184 |

SAMUEL ROTHBERG, *Primary Examiner.*